United States Patent
Sunwoo (10) Patent No.: US 9,964,970 B2
(45) Date of Patent: May 8, 2018

(54) APPARATUS AND METHOD FOR CONTROLLING HEAT IN WIRELESS COMMUNICATION TERMINAL

(71) Applicant: Samsung Electronics Co., Ltd., Gyeonggi-do (KR)

(72) Inventor: Seunghui Sunwoo, Gyeonggi-do (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 673 days.

(21) Appl. No.: 14/295,200

(22) Filed: Jun. 3, 2014

(65) Prior Publication Data

US 2014/0358319 A1    Dec. 4, 2014

(30) Foreign Application Priority Data

Jun. 3, 2013  (KR) .......................... 10-2013-0063454

(51) Int. Cl.
G05D 23/00 (2006.01)
G05D 23/19 (2006.01)

(52) U.S. Cl.
CPC ............................... *G05D 23/1917* (2013.01)

(58) Field of Classification Search
CPC ................................................ G05D 23/1917
USPC ........................................................ 700/300
See application file for complete search history.

(56) References Cited

U.S. PATENT DOCUMENTS

| | | | | |
|---|---|---|---|---|
| 5,428,829 A * | 6/1995 | Osburn | ..................... | H03J 3/28 |
| | | | | 455/193.2 |
| 6,363,490 B1 * | 3/2002 | Senyk | ..................... | G06F 1/206 |
| | | | | 700/204 |
| 7,451,332 B2 * | 11/2008 | Culbert | ................... | G06F 1/206 |
| | | | | 713/300 |
| 2005/0049729 A1 * | 3/2005 | Culbert | .................. | G06F 1/206 |
| | | | | 700/50 |
| 2007/0004372 A1 * | 1/2007 | Adams | .................. | H03F 1/0261 |
| | | | | 455/333 |
| 2008/0034081 A1 * | 2/2008 | Marshall | ................ | G08C 17/02 |
| | | | | 709/223 |
| 2010/0091747 A1 * | 4/2010 | Dorsey | .................. | H04B 1/036 |
| | | | | 370/338 |
| 2010/0103055 A1 * | 4/2010 | Waku | ................. | G06K 19/0723 |
| | | | | 343/702 |
| 2011/0298301 A1 * | 12/2011 | Wong | .................. | H04L 12/2827 |
| | | | | 307/116 |

(Continued)

*Primary Examiner* — Ziaul Karim (57) ABSTRACT

Disclosed herein is an apparatus and a method for controlling heat according to a use environment of a wireless communication terminal in the wireless communication terminal. The method includes measuring an internal temperature of the wireless communication terminal when the wireless communication terminal performs communication by using a predetermined channel or band. The method includes acquiring a heat control method matched to a currently-measured internal temperature from a heat control table having temperature ranges of heat generated within the wireless communication terminal, after the wireless communication terminal selects at least one of bands or channels and performs communication by using the selected at least one band or channel, and storing a heat control method in each temperature range. The method includes controlling the heat generated within the wireless communication terminal according to the acquired heat control method.

17 Claims, 2 Drawing Sheets

(56) References Cited

U.S. PATENT DOCUMENTS

2012/0209558 A1* 8/2012 Wilcox .................... H03B 5/36
                                                                         702/130
2013/0193776 A1* 8/2013 Tanaka .............. H04W 52/0261
                                                                         307/326

* cited by examiner

APPARATUS AND METHOD FOR CONTROLLING HEAT IN WIRELESS COMMUNICATION TERMINAL

CROSS-REFERENCE TO RELATED APPLICATION(S) AND CLAIM OF PRIORITY

The present application is related to and claims priority from and the benefit under 35 U.S.C. § 119(a) of Korean Patent Application No. 10-2013-0063454, filed on Jun. 3, 2013, which is hereby incorporated by reference for all purposes as if fully set forth herein.

TECHNICAL FIELD

This disclosure relates generally to an apparatus and a method for controlling heat in a wireless communication terminal. More particularly, this disclosure relates to an apparatus and a method for controlling heat according to a use environment of a wireless communication terminal in the wireless communication terminal.

BACKGROUND

With the advancement of electric and electronic communication technologies, wireless communication terminals have become higher in performance and smaller in size. Examples of the wireless communication terminal can include various devices, such as smart phones, tablet Personal Computers (PCs), laptop computers, and the like. As a wireless communication terminal has become higher in performance and smaller in size in this manner, there are increasing causes of heat generated within the wireless communication terminal.

SUMMARY

To address the above-discussed deficiencies, it is a primary object to provide an apparatus for adaptively controlling the internal heat of a wireless communication terminal, so as to minimize the performance degradation of the wireless communication terminal, so as to improve the durability of the wireless communication terminal, and so as to meet a required standard of the wireless communication terminal, and a control method thereof.

Also, another embodiment of the present invention provides an apparatus and a method for controlling internal heat according to a use environment of a wireless communication terminal, so as to minimize the performance degradation thereof, so as to improve the durability thereof, and so as to meet a required standard thereof.

In accordance with an aspect of the present invention, an apparatus for controlling heat in a wireless communication terminal is provided. The apparatus includes a heat measurement unit for measuring an internal temperature of the wireless communication terminal. The apparatus also includes a memory configured to store a heat control table having temperature ranges of heat generated within the wireless communication terminal while the wireless communication terminal performs communication for each band or for each channel, and is configured to store a heat control method in each temperature range. The apparatus further includes a control unit configured to receive a temperature measured by the heat measurement unit when the wireless communication terminal selects one of the bands or the channels and performs communication by using the selected one band or channel, acquire, from the heat control table, a heat control method matched to the measured temperature in the selected one band or channel used to perform the communication, and control heat of the wireless communication terminal.

In accordance with another aspect of the present invention, a method for controlling heat in a wireless communication terminal is provided. The method includes measuring an internal temperature of the wireless communication terminal when the wireless communication terminal performs communication by using a predetermined channel or band. The method also includes acquiring a heat control method matched to a currently-measured internal temperature from a heat control table having temperature ranges of heat generated within the wireless communication terminal, when the wireless communication terminal selects at least one of bands or channels and performs communication by using the selected at least one band or channel, and storing a heat control method in each temperature range. The method further includes controlling the heat generated within the wireless communication terminal according to the acquired heat control method.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

The above and other objects, features and advantages of the present invention will be more apparent from the following detailed description in conjunction with the accompanying drawings, in which.

DETAILED DESCRIPTION

Figure 1:
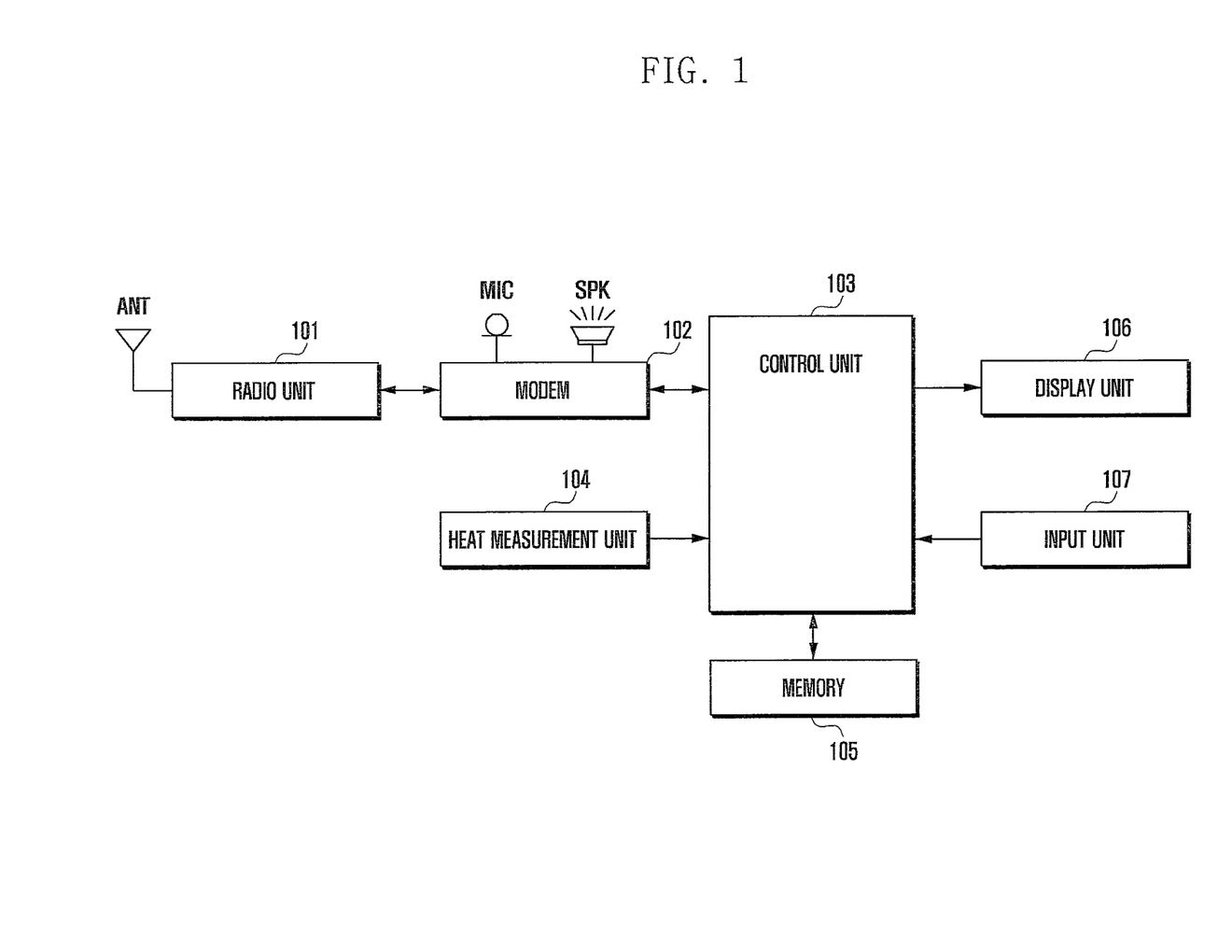
FIG. 1 is a block diagram illustrating an example internal configuration of a wireless communication terminal according to this disclosure.
Figure 2:
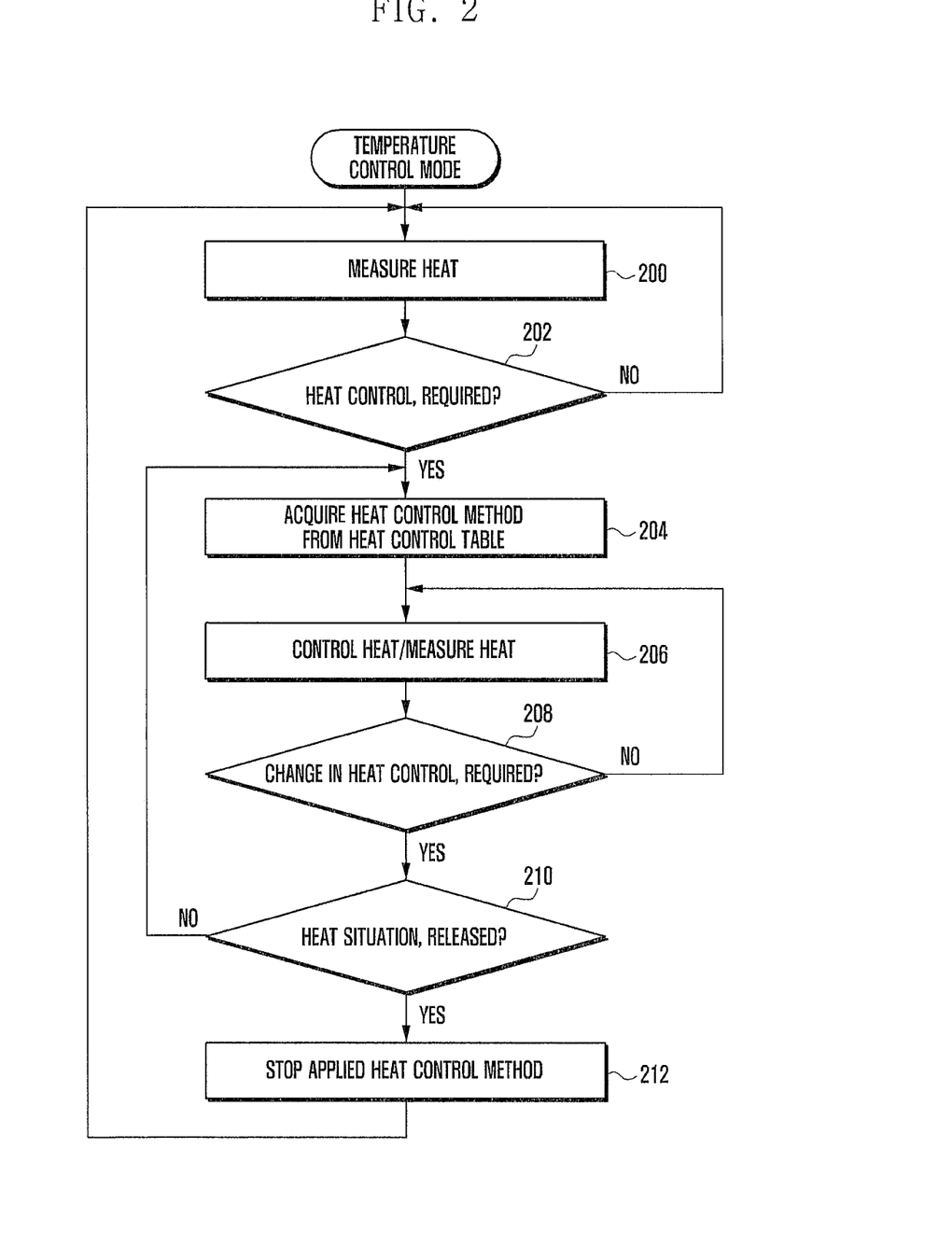
FIG. 2 is a flowchart illustrating an example method for controlling internal heat in a wireless communication terminal according to this disclosure.

FIGS. 1 through 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the present disclosure will be described with reference to the accompanying drawings. The accompanying drawings are provided in order to help understanding of this disclosure, and it should be noted that this disclosure is not limited to a form, disposition and the like which are exemplified in the accompanying drawings. Also, equivalents or extensions of additional embodiments illustrated in the accompanying drawings should be understood from the following description, taken in connection with the accompanying drawings.

Methods for solving the causes of heat in a wireless communication terminal can be divided into at least two types. First, there can be a method for solving a heat problem by using a mechanical material or by using circuit layout. Second, there can be a method for solving a heat problem by controlling an internal circuit.

First, with respect to a first method, in a method using a heat sink element, heat generated within the wireless communication terminal can be rapidly conducted by using a separate mechanical heat sink element (such as a heat sink plate or the like), and thereby problems due to heat generated in a particular element can be solved. In a method using circuit layout, heating elements or a heating element and an element severely affected by heat can be disposed so as to be sufficiently spaced in between, and thereby effects due to internal heat can be minimized.

As a second method, in a method for controlling an internal circuit, a change in temperature can be measured by a temperature sensor mounted within the wireless communication terminal. When the measured temperature is greater than or equal to a preset temperature, heat can be controlled by using a scheme for limiting the supply of current, a scheme for changing a division ratio of a clock frequency, or the like.

The method for mechanically solving a heat problem which is the above-described first method can generally be considered when a product is first designed. Also, even in the case of using the temperature sensor within the wireless communication terminal according to the second method, only a change in temperature of the internal circuit can be sensed, and a current can be limited or a division ratio of a used frequency can be changed. Accordingly, the second method may not adaptively control a temperature according to an environment in which the wireless communication terminal operates.

A case will be described as an example of using the temperature sensor within the wireless communication terminal. When one particular terminal is used, even within the relevant terminal, a heating condition can be different for each frequency band according to an environment used by a user. Also, because wireless communication terminals operate in multiple fields, a case in which a heating condition can become different for each use environment can be on a gradually increasing trend. For example, when a heat problem becomes serious in a particular frequency band or a particular environment, the heat problem can not only degrade the performance of the wireless communication terminal, but can also have a pernicious effect on the durability thereof. Particularly, when use is made of a high-performance Power Amplifier Module (PAM) as in the case of a Long Term Evolution (LTE) terminal, such phenomena can frequently occur in a weak electric field environment.

When a current is limited or a frequency division ratio is changed in view of only a change in internal temperature in the wireless communication terminal as described above, the performance of the wireless communication terminal itself may be degraded, and not only the durability of the wireless communication terminal may be degraded but also the wireless communication terminal may depart from a required standard thereof.

FIG. 1 is a block diagram illustrating an example internal configuration of a wireless communication terminal according to this disclosure.

The wireless communication terminal can be capable of wirelessly communicating with a predetermined network, and can be capable of performing communication in one or more schemes from among wireless networks of various schemes, such as a mobile communication network, and/or a Wi-Fi network and/or a Bluetooth communication network, and the like. In the following description, for convenience of description, a case will be described in which a wireless terminal can communicate with a mobile communication network of an LTE scheme. However, this disclosure can be applied even to a case of communicating with each of wireless communication networks of any other schemes.

Referring to FIG. 1, an antenna (ANT) can be an element capable of transmitting/receiving a frequency of a set band in a mobile communication network. The ANT can provide a received wireless signal to a radio unit 101, and can transmit a signal, which is output from the radio unit 101, into the air.

The radio unit 101 can include a front end module including a duplexer, a filtering and PAM module, and a transceiver module.

The duplexer can provide a signal received from the ANT to the inside of the wireless communication terminal, and can provide a signal to be transmitted, to the ANT. Also, the front end module can select one of two or more bands provided by the mobile communication network according to the control of a modem, and can transmit/receive signals in the selected band. The filtering and PAM module can extract a signal of only a required band from among received signals, and low-noise can amplify the extracted signal. The filtering and PAM module can remove an unnecessary wave from each signal converted into a signal of a transmission band, and can power-amplify the signal of the transmission band without the unnecessary wave. Lastly, the transceiver module can up-convert a signal to be transmitted into a signal of a higher band so as to become a signal of a band required to be transmitted through the mobile communication network, and can down-convert a wireless signal received through the mobile communication network, into a signal of a predetermined lower band. As disclosed herein, a signal of which the band has been down-converted by the transceiver module, and a signal to be transmitted by the transceiver module can both be referred to as "baseband signals."

The modem 102 can encode and/or modulate a signal of a baseband to be transmitted, and can demodulate and/or decode a received signal of a baseband. In FIG. 1, the mobile communication terminal can be considered. Accordingly, the modem 102 illustrated in FIG. 1 can include a vocoder for modulating and demodulating a voice signal and performing encoding/decoding. In this regard, when operating as the vocoder, the modem 102 can receive an electrical voice signal from a MIC, and can convert the electrical voice signal into digital voice data. Also, when operating as the vocoder, the modem 102 can convert digital voice data into an analog electrical voice signal, and can output the analog electrical voice signal through a Speaker (SPK). In addition, when data is received which is not data required to process a voice and/or sound, the modem 102 can perform a series of operations, such as modulation, demodulation, encoding and decoding, according to the control of a control unit 103.

The control unit 103 can control overall operations required by the mobile communication terminal. Particularly, in an embodiment, the control unit 103 can measure the internal heat of the mobile communication terminal, and can perform control for adjusting heat, when the degree of the measured internal heat requires heat control. A control method for adjusting heat of the mobile communication terminal according to this disclosure will be described in more detail below with reference to a flowchart illustrating the control method.

The heat measurement unit 104 can be a module for quantifying heat generated within the mobile communication terminal or converting the heat generated within the mobile communication terminal into a numerical value and outputting the quantified heat or the numerical value. When the heat measurement unit 104 is configured in the simplest manner, the heat measurement unit 104 can be implemented by using a thermistor which is an element having a variable resistance according to temperature. However, according to a condition for configuring a circuit, the heat measurement unit 104 can be implemented by using various elements or in various forms, other than the thermistor, which can enable the measurement of heat generated within the mobile communication terminal. When the heat measurement unit 104 is implemented by using the thermistor, the control unit 103 can receive, as input, a digital value matched to a resistance change of the thermistor.

Examples of a memory 105 can include storage mediums, such as a Read Only Memory (ROM), a Random Access Memory (RAM), and/or the like. The memory 105 can store various control data required for an operation of the mobile communication terminal, and can store control data for controlling heat. Also, the memory 105 can store a heat control table. Further, the memory 105 can include areas for storing user data.

A display unit 106 can be implemented in the form of a Liquid Crystal Display (LCD) panel, a Light-Emitting Diode (LED) panel, and/or the like. According to the control of the control unit 103, the display unit 106 can display a state of the mobile communication terminal in a process and a standby state required for an operation of the mobile communication terminal. Also, the display unit 106, although not illustrated in FIG. 1, can include backlight in order to effectively show the displayed data to a user.

An input unit 107 can include a touch sensor for sensing a touch input by the user, a key button for receiving a key input, and the like. The input unit 107 can receive a signal and/or a key input signal corresponding to a touch input by the user, and can provide the received signal and/or key input signal to the control unit 103.

In FIG. 1, a power supply module can provide power required for each element illustrated in FIG. 1. Also, when the control unit 103 performs heat control, the power supply module can adjust the amount of power provided from the power supply module to each element.

FIG. 2 is a flowchart illustrating an example method for controlling internal heat in a wireless communication terminal according to this disclosure.

FIG. 2 illustrates an operation in a temperature control mode. The temperature control mode can signify an operation continuously performed while the wireless communication terminal is powered on, or can be configured so as to operate only when communication is performed. More specifically, typically, much heat can be generated in the wireless communication terminal while data communication is performed. Accordingly, consideration can be given to a configuration of performing heat control when communication is performed. Also, when various tasks are capable of being performed in a terminal as in the case of a smart phone, although communication is not performed, much power can be consumed during graphics processing, and the like, so that heat can be excessively generated in the terminal. Even in this case, a heat control operation can be performed. However, a heat control in the case of performing communication will be described below.

First, in the following description, for convenience of description, a case will be described in which the wireless communication terminal can comply with the LTE standard and supports bands B1, B7 and B20. Also, the case will be described in which the heat measurement unit 104 of the wireless communication terminal is implemented by using a thermistor. When the heat measurement unit 104 is implemented by using the thermistor, the thermistor can be connected between an ADCIN terminal, which is a particular terminal of the control unit 103, and the ground.

In the heat measurement unit 104 implemented by using the thermistor, a resistance value of the thermistor can be changed according to a change in heat within the wireless communication terminal. When the resistance value of the thermistor is changed, the amount of current flowing through the thermistor can also be changed. Accordingly, the control unit 103 can detect a change in the amount of current flowing through the thermistor, and thereby can recognize a change in resistance value. The change in resistance value can consequently signify the occurrence of a rise or drop in internal temperature of the wireless communication terminal. Therefore, the control unit 103 can measure a change in internal temperature of the wireless communication terminal through a change in a resistance value of the thermistor. As described above, in step 200, the control unit 103 can measure the heat generated within the wireless communication terminal by using a numerical value acquired from the amount of current flowing through the thermistor.

Further, the case is described in which the wireless communication terminal can be in a state of defining a heat control table storing a control method according to a change in resistance value for each band. The heat control table can be exemplified in Table 1 below.

TABLE 1

| Band | Resistance value | ADC | Heat control method |
|------|------------------|-----|---------------------|
| B1   | R1               | 300 | normal operation    |
|      | R2               | 305 | normal operation    |
|      | R3               | 310 | normal operation    |
|      | R4               | 315 | normal operation    |
|      | R5               | 320 | normal operation    |
|      | ...              | ... | ...                 |
| B7   | R1               | 330 | normal operation    |
|      | R2               | 335 | normal operation    |
|      | R3               | 340 | normal operation    |
|      | R4               | 345 | first heat control  |
|      | R5               | 350 | second heat control |
|      | ...              | ... | ...                 |

TABLE 1-continued

| Band | Resistance value | ADC | Heat control method |
|---|---|---|---|
| B20 | R1 | 320 | normal operation |
|  | R2 | 325 | normal operation |
|  | R3 | 330 | normal operation |
|  | R4 | 335 | normal operation |
|  | R5 | 340 | normal operation |
|  | ... | ... | ... |

First, the heat control table shown in Table 1 will be described. The heat control table can include set resistance values changed in response to a change in internal temperature for each band. In Table 1, because the resistance values may not be capable of being actually measured, an Analog-to-Digital Conversion (ADC) value capable of being detected in response to a change in each resistance value can be written in parallel. Accordingly, a resistance value may not be included in the actual table stored in the memory 105. Also, each resistance value (such as each ADC value) can have a heat control method for controlling heat. A normal operation, first heat control, second heat control, and the like can be set for heat control methods.

Meanwhile, in Table 1, a heat control method can be matched to a change in resistance value for each band, but a heat control method can be different for each frequency or channel according to a communication system.

Alternatively, the heat control table shown in Table 1 can include values which have been set by the manufacturer that produces the wireless communication terminal. Specifically, after methods for controlling heat are previously set according to results checked at the time of designing the wireless communication terminal, whether heat needs to be controlled, whether a normal operation may be performed, or the like, by using an ADC value changed according to a resistance value of the thermistor can be previously determined as shown in Table 1 at the time of manufacturing the wireless communication terminal.

A reason why a resistance value is different for each band in Table 1 can be because, in a wireless communication system, operating characteristics of an amplifier, Radio Frequency (RF) matching performed on a wireless signal, and a response to characteristics of each of the modem, the control unit and the like can depend on each band and thereby efficiency can be different for each band. Another reason why a resistance value is different for each band can be because a heat condition can be changed according to various factors, such as a mechanical disposition environment of the elements and the like. Accordingly, the heat control table shown in Table 1 can be previously set according to the mechanical environment for each band, efficiencies of the elements for each band, and the like.

Also, ranges of resistance values for each band can be determined in the following manner. For example, in band B1, a range of resistance value R1 of the thermistor can correspond to a case in which an ADC value is greater than or equal to 300 and is less than 305. A range of resistance value R2 can correspond to a case in which an ADC value is greater than or equal to 305 and is less than 310. A range of resistance value R3 can correspond to a case in which an ADC value is greater than or equal to 310 and is less than 315. A range of resistance value R4 can correspond to a case in which an ADC value is greater than or equal to 315 and is less than 320. In addition, the heat control table in Table 1 shows, as an example, a case in which the wireless communication terminal can have a poor heat condition in band B7 of the LTE standard.

Hereinafter, a process for controlling heat is described with reference to FIG. 2. In step 200, the control unit 103 can numerically measure heat generated within the wireless communication terminal by using information provided by the heat measurement unit 104. In step 202, the control unit 103 can identify a range of the heat control table, to which the numerically-measured heat information belongs, and thereby can determine whether heat control is required. At this time, the control unit 103 can be in a state of previously receiving information on the selection of a band by the radio unit 101 and knowing the selected band by using the modem 102, an Inter-Process Communication (IPC) scheme, and the like. In other words, the control unit 103 can previously know that the currently-selected band is band B1, band B7, or band 20. Accordingly, the control unit 103 can acquire a heat control method by mapping an ADC value, which has been received as input from the heat measurement unit 104, to the heat control table.

Specifically, the control unit 103 can map the ADC value received as input in step 202 to the heat control table in the currently-selected band, and thereby can determine whether a current situation requires heat control. Actually, the control unit 103 can operate according to a heat control method matched to a current temperature. In other words, the control unit 103 can apply a normal heat control method to a heat control method in the case of a normal operation in Table 1. When performing the first heat control or the second heat control shown in Table 1, the control unit 103 can apply a high temperature heat control method to the first heat control or the second heat control. In the case of the normal heat control method, the control unit 103 may not perform special heat control. When performing the first heat control or the second heat control, the control unit 103 can apply preset heat control techniques to the first heat control or the second heat control. This configuration can be consequently regarded as a result identical to controlling heat after determining whether the amount of heat generated within the wireless communication terminal is above or equal to a preset temperature.

When a result of the determination in step 202 shows that the amount of heat generated within the wireless communication terminal is large and a current situation requires heat control, the control unit 103 can proceed to step 204. Otherwise, the control unit 103 can proceed to step 200, and continuously measures heat. In other words, when high temperature heat control is required, the control unit 103 can proceed to step 204. In the case of normal heat control, the control unit 103 can perform step 200.

When the result of the determination in step 202 shows that the heat control is required, the control unit 103 can proceed to step 204, and can acquire a high temperature heat control method matched to the ADC value acquired in step 200, from the heat control table.

With respect to this configuration, a case of band B7 in Table 1 is described as an example. As shown in Table 1, when heat control is required in band B7, an ADC value can be greater than or equal to 345. When it is determined in step 202 that the heat control is required and the control unit 103 can proceed to step 204, in general, the ADC value is greater than or equal to 345 and is less than 350. This can be because a change in heat within the wireless communication terminal may not be sharply increased by a value greater than or equal to 350. Accordingly, when proceeding to step 204, the control unit 103 can acquire a first heat control method in Table 1, and can proceed to step 206. In step 206, the control unit 103 can control heat according to the acquired first heat control method.

Hereinafter, the first heat control method and a second heat control method will be described.

The first heat control, the second heat control, and the like may use various methods. For example, an Adaptive Priority Transmission (APT) scheme for adaptively reducing transmission power can be used as the first heat control method or the second heat control method. A method for performing control so as to reduce the brightness of backlight of the display unit 106 or the brightness of the display unit 106 itself can be used as another method. In a still another method, heat can be reduced by limiting a clock of the modem 102 and/or the control unit 103.

Also, when the second heat control method is used, the first heat control and the second heat control can be performed together, or only the second heat control method can be used. Specifically, consideration can be given to a case in which the first heat control corresponds to a method for adaptively reducing transmission power and the second heat control can correspond to a method for reducing the brightness of backlight or that of the display unit 106 itself and limiting a clock. In this case, when an internal heat situation of the wireless communication terminal becomes worse in a situation of the first heat control and the control unit 103 proceeds to a case requiring the second heat control, the first heat control and the second heat control can be simultaneously performed. Alternatively, in an embodiment, when an internal heat situation of the wireless communication terminal becomes worse in a situation of the first heat control and the control unit 103 proceeds to a case requiring the second heat control, consideration can be given to a configuration in which the first heat control is stopped and only the second heat control is performed.

Typically, when a situation of the second heat control arises, a situation has occurred in which the internal temperature of the wireless communication terminal continuously rises although the first heat control can be performed. Accordingly, it is desirable that the first heat control and the second heat control can be performed together. In this regard, hereinafter, in the situation of the second heat control, a case will be described in which the first heat control and the second heat control can be performed together.

When the first heat control is to adaptively control transmission power, the control unit 103 can provide control data in order to enable the radio unit 101 and/or the modem 102 to adaptively reduce transmission power. Through the provided control data, the radio unit 101 and/or the modem 102 can adaptively adjust the transmission power, and thereby can reduce heat generated within the wireless communication terminal.

At this time, after the control unit 103 controls the radio unit 101 and/or the modem 102 to reduce the internal heat, the control unit 103 can identify an ADC value received as input from the heat measurement unit 104, and can thereby continuously measure internal heat.

After measuring the internal heat, the control unit 103 can proceed to step 208, and can determine whether a change in heat control is required. Cases requiring a change in heat control can be divided into two cases. First, consideration is given to a case in which the amount of heat can be increased and additional control can be required. Specifically, a case may be considered in which, in band B7 shown in Table 1, an ADC value which has been greater than or equal to 345 and less than 350 can be increased so as to be greater than or equal to 350. In contrast, a case can be considered in which, in band B7 shown in Table 1, the ADC value which has been greater than or equal to 345 and less than 350 is reduced so as to be less than 345.

When a change in heat control is required as described above, the control unit 103 can proceed to step 210, and can determine whether a current case is a case of releasing a heat situation. Specifically, the control unit 103 can determine whether a current case is a case in which the ADC value which has been greater than or equal to 345 and less than 350 is reduced so as to be less than 345. When a result of the determination in step 210 shows that the heat situation is released, the control unit 103 can proceed to step 212.

In contrast, if the heat control needs to be changed and the current case is not the case of releasing the heat situation, this case is a case in which the heat situation can become worse, namely, a case in which, in band B7, the ADC value which has been greater than or equal to 345 and less than 350 can be increased so as to be greater than or equal to 350. Accordingly, after the control unit 103 proceeds to step 204 and acquires a heat control method matched to the ADC value from the heat control table, the control unit 103 can proceed to step 206.

Cases in which the control unit 103 proceeds from step 210 to step 212 can be divided into two cases. First, when an ADC value has a normal state control value in the heat control table shown in Table 1, there exists a method for immediately releasing heat control, and a hysteresis of a previously-set predetermined value can be designated for the ADC value. Specifically, a condition for driving heat control can be performed according to a value in Table 1, and a condition for releasing heat control can be set to a value lower by 5 or 10 than an ADC value in Table 1. For example, in band B7, a condition for driving heat control can correspond to a case in which an ADC value is greater than or equal to 345. Accordingly, when an ADC value is less than 345, the heat control can be immediately released. However, when a hysteresis of 10 is designated for an ADC value, if an ADC value which is (a condition for driving heat control—10) becomes 335 in the heat control table shown in Table 1, the heat control can be released.

When the result of the determination in step 210 shows that the heat situation is released, the control unit 103 can proceed to step 212. In step 212, after the control unit 103 stops the applied heat control method and changes a current state to a normal control state, and the control unit 103 can proceed to step 200.

As described above, in the wireless communication terminal, heat control may not be applied to all bands in an identical form, but heat can be controlled differently according to a condition for each band. Accordingly, it can be possible to prevent the uniform degradation of communication quality or the uniform degradation of service quality in the wireless communication terminal.

In the wireless communication terminal according to this disclosure, heat generated within the wireless communication terminal can be adaptively controlled according to a use environment and the like, so that the degradation of performance of the wireless communication terminal can be minimized and the durability of the wireless communication terminal can be improved through minimizing the degradation of performance thereof.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for controlling heat in a wireless communication terminal, the apparatus comprising:
a radio unit configured to transmit and receive a wireless signal of at least one of a band or a channel;
a modem configured to modulate and encode a signal to be transmitted, and demodulate and decode a received signal;
a heat measurement unit configured to measure an internal temperature of the wireless communication terminal;
a memory configured to store a heat control table including each band or each channel having two or more temperature ranges, and a heat control method in each temperature range; and
a control unit configured to:
select the at least one of the band or the channel for a wireless communication;
control the modem and the radio unit to communicate with the selected at least one of the band or the channel;
receive an internal temperature of the wireless communication terminal measured by the heat measurement unit when communicating using the selected at least one of the band or the channel;
acquire, from the heat control table, a heat control method matched to the measured temperature in the selected at least one of the band or the channel; and
control internal heat of the wireless communication terminal based on the acquired heat control method,
wherein the heat control method comprises a normal heat control method allowing an operation to be performed in a normal state, and a high temperature heat control method for reducing heat after the internal temperature of the wireless communication terminal is increased so as to be greater than or equal to a preset value,
wherein the high temperature heat control method comprises reducing transmission power of the wireless communication terminal, and
wherein the normal state is a state in which the temperature measured by the heat measurement unit is less than the preset value.

2. The apparatus of claim 1, wherein the high temperature heat control method further comprises at least one of:
a technique configured to adaptively adjust power provided to the radio unit or the modem of the wireless communication terminal;
a technique configured to limit a brightness of a display unit of the wireless communication terminal; and
a technique configured to limit a clock of the wireless communication terminal.

3. The apparatus of claim 1, wherein the heat measurement unit comprises a thermistor having a resistance changed according to a temperature.

4. The apparatus of claim 1, wherein, after the temperature measured by the heat measurement unit is increased and additional heat control is required while the control unit acquires a heat control method from the heat control table and controls the heat, the control unit is configured to acquire a heat control method matched to the measured temperature from the heat control table, and is configured to perform the additional heat control.

5. The apparatus of claim 1, wherein, after the temperature measured by the heat measurement unit is reduced and a situation of releasing heat occurs while the control unit acquires a heat control method from the heat control table and controls the heat, the control unit is configured to release the heat control method, and is configured to control the wireless communication terminal to operate in the normal state.

6. The apparatus of claim 5, wherein a lower temperature than the preset value, which is set for a necessary condition for heat control, is set for the situation of releasing the heat.

7. The apparatus of claim 1, wherein the heat measurement unit is configured to quantify heat generated within the wireless communication terminal and convert the heat generated within the wireless communication terminal into a numerical value.

8. The apparatus of claim 3, wherein the control unit is configured to correlate a resistance value of the thermistor in order to determine a temperature in the wireless communication terminal.

9. The apparatus of claim 1, wherein the heat control method is different depending which band or channel is selected.

10. A method for controlling heat in a wireless communication terminal, the method comprising:
selecting at least one of a band or a channel for a wireless communication;
measuring an internal temperature of the wireless communication terminal when the wireless communication terminal communicates using the selected at least one of the band or the channel;
acquiring a heat control method matched to a currently-measured internal temperature corresponding to the selected at least one of the band or the channel from a heat control table; and
controlling the heat generated within the wireless communication terminal according to the acquired heat control method,
wherein the heat control table includes each band or each channel having two or more temperature ranges, and further includes a heat control method in each temperature range,
wherein the heat control method comprises a normal heat control method allowing an operation to be performed in a normal state, and a high temperature heat control method for reducing heat after the internal temperature of the wireless communication terminal is increased so as to be greater than or equal to a preset value,
wherein the high temperature heat control method comprises reducing transmission power of the wireless communication terminal, and
wherein the normal state is a state in which the temperature measured by a heat measurement unit is less than the preset value.

11. The method of claim 10, wherein the high temperature heat control method further comprises at least one of:
a technique for adaptively adjusting power provided to a radio unit or a modem of the wireless communication terminal;
a technique for limiting a brightness of a display unit of the wireless communication terminal; and
a technique for limiting a clock of the wireless communication terminal.

12. The method of claim 11, further comprising:
measuring an internal temperature of the wireless communication terminal while the high temperature heat control method is applied; and additionally applying one of the high temperature heat control method when the measured internal temperature is increased.

13. The method of claim 11, comprising:

measuring an internal temperature of the wireless communication terminal while the high temperature heat control method is applied; and releasing the high temperature heat control method and applying the normal heat control method, when the measured internal temperature is reduced.

14. The method of claim 13, wherein a temperature is lower than another temperature to which the high temperature heat control method is applied, when the high temperature heat control method is released and the normal heat control method is applied.

15. The method of claim 10, wherein measuring the internal temperature of the wireless communication terminal comprises quantifying heat generated within the wireless communication terminal and converting the heat generated within the wireless communication terminal into a numerical value.

16. The method of claim 10, wherein measuring the internal temperature of the wireless communication terminal comprises correlating a resistance value of a thermistor in order to determine a temperature in the wireless communication terminal.

17. The method of claim 10, wherein controlling the heat generated within the wireless communication terminal comprises controlling the heat generates based on which band or channel is selected.

* * * * *